(No Model.)

C. ANDERSON.
FLY TRAP.

No. 340,471. Patented Apr. 20, 1886.

Witnesses
Jos. S. Latimer
R. T. Campbell

Inventor
Clark Anderson
By his Attorney
Frank Sheehy.

N. PETERS. Photo-Lithographer. Washington, D. C.

UNITED STATES PATENT OFFICE.

CLARK ANDERSON, OF HOLDEN, MISSOURI, ASSIGNOR TO A. ANDERSON AND J. U. STRODE, OF SAME PLACE.

FLY-TRAP.

SPECIFICATION forming part of Letters Patent No. 340,471, dated April 20, 1886.

Application filed February 6, 1886. Serial No. 190,996. (No model.)

*To all whom it may concern:*

Be it known that I, CLARK ANDERSON, a citizen of the United States, residing at Holden, in the county of Johnson and State of Missouri, have invented certain new and useful Improvements in Fly-Traps; and I do declare the following to be a full, clear, and exact description of the invention, such as will enable others skilled in the part to which it appertains to make and use the same, reference being had to the accompanying drawings, and to the letters and figures of reference marked thereon, which form a part of this specification.

This invention has relation to improvements in fly-traps; and it consists in the construction, novel arrangement, and adaptation of devices, as will be hereinafter more fully set forth and claimed.

Figure 1:
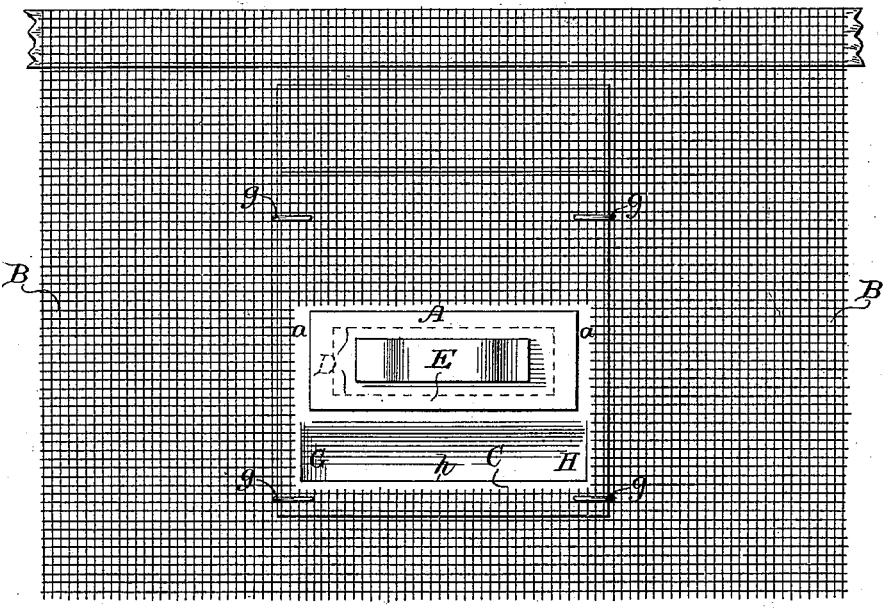
Figure 2:
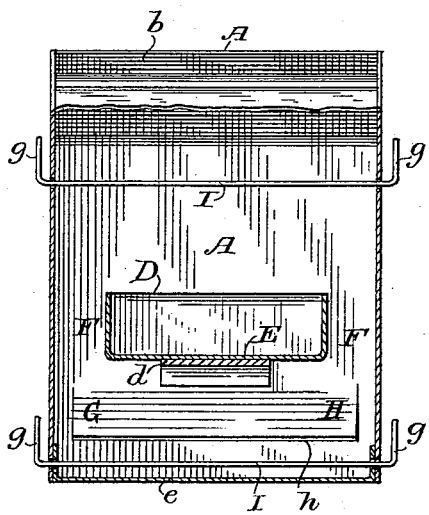
Figure 3:
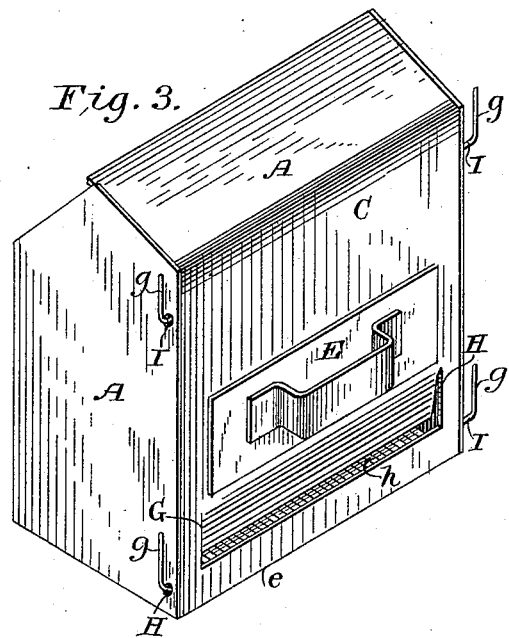

The invention is illustrated in the accompanying drawings, in which Figure 1 shows the trap applied to a portion of a window-screen. Fig. 2 is a vertical sectional view of the trap detached from the screen, and Fig. 3 is a perspective view of the trap.

Referring by letter to the said drawings, A indicates the trap, which in the present instance is shown as formed of sheet-tin, but may be formed of wire or other suitable material, and B indicates a screen, which may be a window-screen or door having an opening, $a$, which should be of a size about the same as the drawer opening and slot in the back wall of the trap A.

This trap is preferably of rectangular elongated form, having the roof or top walls slanting to opposite sides from a central vertical point, as shown, and the top is provided with a slotted opening, $b$, which extends transversely across the same, and is designed to admit light to the interior of the trap, and serves as an outlet-passage for flies and the like, which may enter from the opening in the back wall, C.

D indicates a transverse opening in the back wall, C, for the introduction of the drawer E, which, when placed therein, will close the said opening. A strip, $d$, is arranged beneath the said opening within the body of the trap to support the said drawer. This drawer is designed to hold the bait or other matter to attract the insects.

When the drawer is placed in position within the trap, there is a vertical space or passage, F, left at opposite sides of the said drawer, so that light may show to the floor $e$ and permit the flies as they enter to come up in the trap and escape at the outlet $b$, being attracted to the inside of the trap by the light which enters at the said opening $b$ and the bait in the drawer or receptacle within the trap or main frame.

In the lower portion of the rear wall and below the drawer-opening is a transverse opening, $h$, which may be formed by slitting the said wall, as shown at G and H, and bending the slitted portion inwardly sufficient to permit the entrance of flies and other insects which infest a room.

I are attaching devices, consisting of two transverse wires, which pass through perforations in the vertical side walls of the main frame and terminate in attaching-arms $g$, which may be bent or otherwise secured to the screen.

To apply the trap to a screen, it is only necessary to place the back wall of the main frame or trap against a screen so as to have the drawer-opening and inlet to coincide with the opening previously formed in the screen, and securing the attaching-wires thereto. The bait, which may be sugar, molasses, or the like, is then placed in the drawer and the said drawer placed in the opening of the rear wall.

This device is durable, simple in construction, effective in removing flies from a room, and may be manufactured at a very small expense.

Having described my invention, what I claim is—

1. As an improved article of manufacture, a fly-trap formed of sheet metal, having a drawer-opening, and an entrance in its rear wall, an opening in its roof to admit light and form an outlet-passage, a drawer adapted to hold bait, and wire arms for securing the whole to a screen, substantially as specified.

2. The combination, with a window or door screen having an opening, as described, of a trap having an opening in its roof to admit light and form an outlet-passage, a drawer-opening and inlet-aperture in its rear wall adapted to coincide with the opening in the screen, a removable bait-holder, and the arms for securing the trap to the screen, substantially as set forth.

In testimony whereof I affix my signature in presence of two witnesses.

CLARK ANDERSON.

Witnesses:
    J. U. STRODE,
    J. H. GEORGE.